US012763805B2

(12) United States Patent
Rajamani et al.

(10) Patent No.: US 12,763,805 B2
(45) Date of Patent: Oct. 13, 2026

(54) METHOD AND APPARATUS FOR CREST FACTOR REDUCTION

(71) Applicant: Intel Corporation, Santa Clara, CA (US)

(72) Inventors: Kannan Rajamani, Basking Ridge, NJ (US); Sunitha Motipalli, Pompano Beach, FL (US); Albert Molina, Novelda (ES); Joseph Othmer, Ocean, NJ (US); Kameran Azadet, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/147,720

(22) Filed: Dec. 29, 2022

(65) Prior Publication Data

US 2024/0223228 A1 Jul. 4, 2024

(51) Int. Cl.
*H04B 1/04* (2006.01)
*H04L 27/26* (2006.01)

(52) U.S. Cl.
CPC ....... *H04B 1/0475* (2013.01); *H04L 27/2623* (2013.01); *H04B 2001/0408* (2013.01); *H04B 2201/70706* (2013.01)

(58) Field of Classification Search
CPC ........... H03F 3/20; H03F 3/24; H04B 1/0475; H04B 1/38; H04B 1/40; H04B 2001/0408; H04B 2001/0416; H04B 2201/70706; H04L 27/2614; H04L 27/2623; H04L 27/2624
USPC ........ 375/219, 222, 260, 296–298; 381/94.1, 381/94.8; 455/501, 63.1, 67.13, 114.3, 455/115.1
See application file for complete search history.

(56) References Cited

U.S. PATENT DOCUMENTS

| | | | | |
|---|---|---|---|---|
| 9,054,928 | B1 * | 6/2015 | Copeland | H04L 27/2623 |
| 2001/0006359 | A1 * | 7/2001 | Suzuki | H04L 27/2626 455/72 |
| 2016/0028574 | A1 * | 1/2016 | Wang | H04L 27/367 375/296 |
| 2017/0187560 | A1 * | 6/2017 | Ng | H03F 1/3282 |
| 2020/0204420 | A1 * | 6/2020 | Megretski | H04L 27/2614 |
| 2022/0417071 | A1 * | 12/2022 | Kwon | H04B 1/0475 |
| 2024/0007337 | A1 * | 1/2024 | Motipalli | H04L 27/2618 |

* cited by examiner

*Primary Examiner* — Young T. Tse
(74) *Attorney, Agent, or Firm* — 2SPL Patent Attorneys PartG mbB; Yong Beom Hwang

(57) ABSTRACT

An apparatus and method for performing crest factor reduction (CFR). A peak detection circuit detects peaks from input signal samples based on a first threshold. The first threshold is higher than a second threshold that is determined based on a target peak-to-average power ratio (PAPR). A gain computation circuit determines a gain factor for at least one detected peak. A scaled cancellation pulse generation circuit generates a scaled cancellation pulse for the at least one detected peak based on the gain factor. A combiner circuit combines the scaled cancellation pulse with the input signal samples to generate an output signal. A hard clipping circuit may compress the output signal based on the second threshold. The first threshold is set slightly higher than the second threshold.

18 Claims, 10 Drawing Sheets

METHOD AND APPARATUS FOR CREST FACTOR REDUCTION

BACKGROUND

Crest Factor Reduction (CFR) is a technique used to reduce a peak-to-average power ratio (PAPR) of transmitted signals. With CFR, the power amplifier to be used for transmission of the signals can operate more efficiently. By implementing CFR, the dynamic range of a transmitted signal is reduced so that the power amplifier being used to transmit the signal can run with less back off. In a wireless communication system, CFR may be used in combination with digital up-conversion (DUC) and digital pre-distortion (DPD).

As an example, the transmit signals of a base station in a wireless communication system have a high PAPR due to the use of multiple access modulation schemes. The power amplifier can operate more efficiently when the transmit signal has a higher average power. By lowering the PAPR of the transmit signal, it is possible to transmit at a higher average power.

The simplest CFR technique for PAPR reduction is magnitude clipping. Magnitude clipping involves hard clipping the samples of the signal whose magnitude is above a pre-set clipping level to the clipping level while maintaining its phase. This method has minimum effect on error vector magnitude (EVM). An EVM is a measure of the difference between the ideal symbols and the measured symbols.

Clipping reduces large peaks but also introduces distortion in the signal. The sharp corners of the clipped signal cause out-of-band radiation and reduces the adjacent channel leakage ratio (ACLR). An ACLR is the ratio of filtered mean power centered on the assigned channel frequency to the filtered mean power centered on an adjacent channel frequency. Hard clipping is hardly used due to the worst ACLR. It may be used as a last stage in other CFR techniques to achieve the target PAPR. To reduce the unwanted out-of-band emissions, the clipped signal may be processed by a low-pass filter to reduce the high frequency signals which correspond to the sharp corners in the clipped signal.

Peak windowing is also a CFR technique used to reduce the PAPR. Peak windowing aims to smooth the sharp corners of the hard-clipped signals. In peak windowing, the clipping is implemented by multiplying the original signal in the region of the peak with a windowing function.

Peak cancellation is another technique to reduce the PAPR of a transmit signal. Peak cancellation technique aims to strike a balance between the out-of-band emission and in-band waveform quality when compressing the signal to a target PAPR.

There is a need for a CFR technique supporting single or multiple carrier configurations and having flexible selection of output PAPR regardless of input modulation type. In addition, its performance should have a good trade-off between the out-of-band radiation (e.g., ACLR) and in-band distortion (e.g., EVM) and meet operating band unwanted emission (OBUE).

BRIEF DESCRIPTION OF THE FIGURES

Some examples of apparatuses and/or methods will be described in the following by way of example only, and with reference to the accompanying figures, in which.

DETAILED DESCRIPTION

Figure 1:
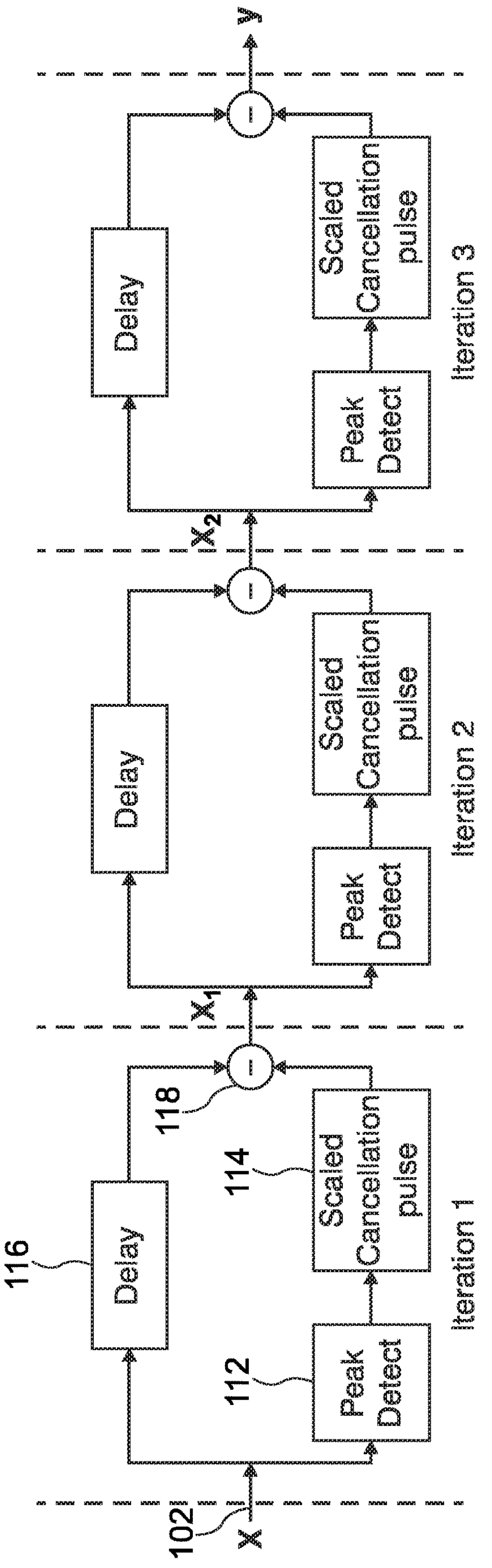
FIG. 1 Prior Art
FIG. 1 is a diagram of a conventional peak cancellation CFR technique.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Conventional peak cancellation CFR scheme is typically performed by first using peak detection in which all the peaks of the signal that are above a predetermined threshold are detected. Then, the identified peaks are cancelled by subtracting a scaled cancellation pulse from the signal to reduce its peak amplitude. However, the peak cancellation used in accordance with such conventional CFR techniques may result in peak regrowth, in which new peaks appear or regrow in the signal sample due to the noise induced in band via the cancellation pulse.

FIG. 1 is a diagram of a conventional peak cancellation CFR technique. Conventional peak cancellation CFR technique generally requires several iterations of peak detection and cancellation to achieve the target PAPR. FIG. 1 shows three iterations of peak detection and cancellation. An input signal 102 may comprise a block of data samples. In each iteration, the peaks that are above a threshold in the input signal are identified and scaled cancellation pulse is generated and subtracted from the input signal. In the first iteration, peak detection is performed by a peak detection circuit 112 on the input signal 102. The scaled cancellation pulse generation circuit 114 then generates a scaled cancellation pulse for a detected peak(s), which is then subtracted by a combiner circuit 118 from the input signal that is delayed by a delay circuit 116 to generate an output signal x1. Due to peak regrowth, the output signal x1 may still comprise samples having a magnitude that exceeds the predetermined threshold value, and thus this process is repeated in a second iteration to generate a second output signal x2, and third iteration may then be performed to finally yield the output signal y that meets the PAPR goal. The execution of several iterations in this manner increases the complexity and processing power required to execute the CFR algorithm and may also increase the signal EVM.

For the peak detection, the peak detection circuit 112 identifies the magnitude of each pulse in the input signal samples and compare it to a pre-determined threshold. The threshold is determined based on the target PAPR. The peak detection circuit 112 detects all the peaks of the signal that are above the threshold, which may result in a sequence of peaks. The scaled cancellation pulse generation circuit 114 generates a scaled cancellation pulse for each detected peak. The identified peaks are cancelled by subtracting a scaled cancellation pulse from the input signal 102 to reduce its peak amplitude. The scaled cancellation pulse is subtracted by the combiner circuit 118 from the input signal 102 delayed by the delay circuit 116 to generate a CFR output signal. The target PAPR may not be achieved by one iteration. Therefore, multiple iterations may be performed to achieve the target PAPR. The CFR output signal of each iteration is used as an input signal for the next iteration.

This conventional CFR technique has numerous disadvantages. The cancellation of a peak may cause peak regrowth due to which several iterations of peak detection and cancellation are needed. The conventional CFR scheme may increase EVM and the complexity of the algorithm.

Figure 2:
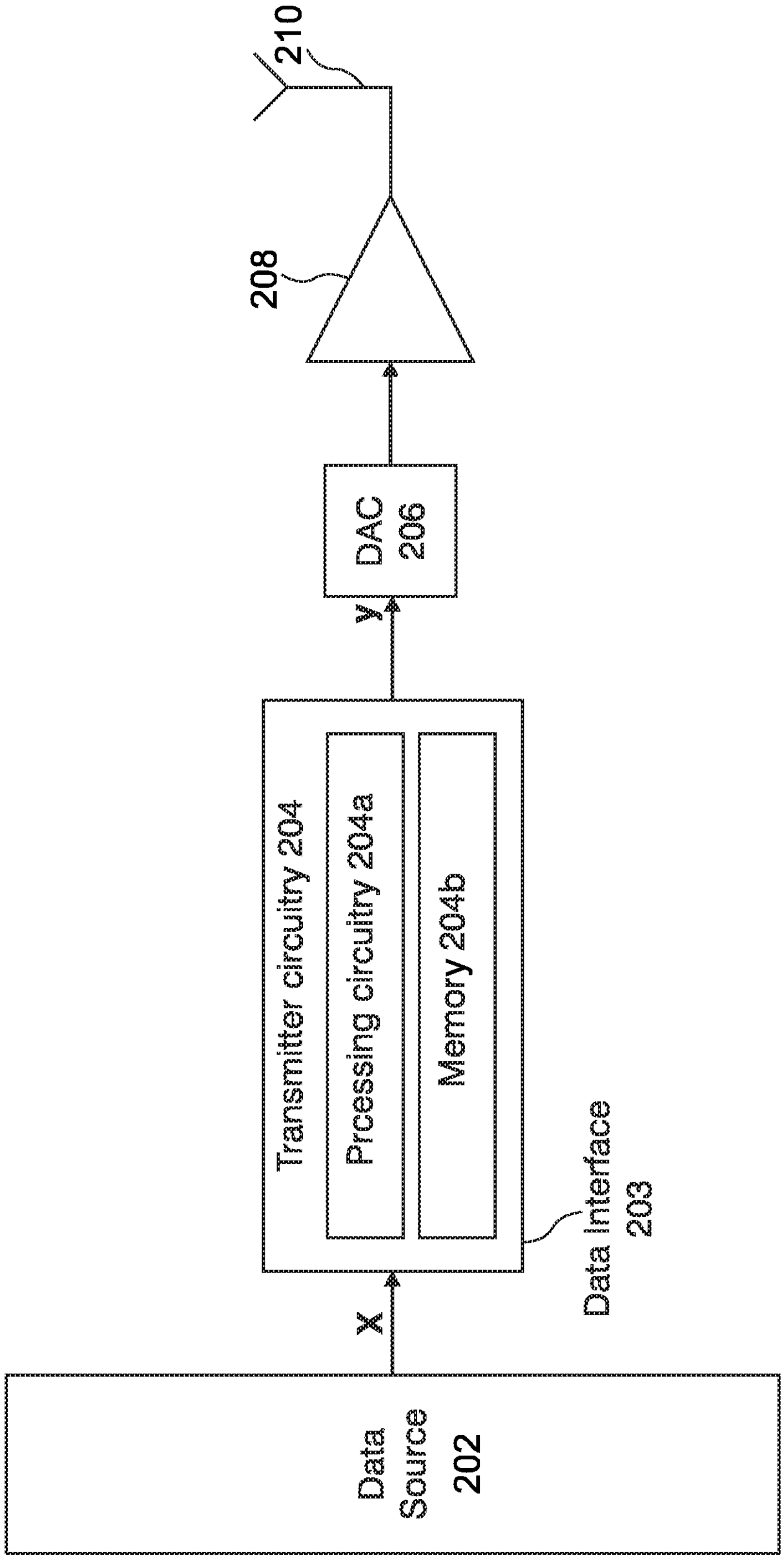
FIG. 2 illustrates a block diagram of a transmit chain in accordance with one example.

FIG. 2 illustrates a block diagram of a transmit chain in accordance with one example. The transmit chain 200 as shown in FIG. 2 may be included in any suitable type of device that transmits and optionally receives wireless data. The transmit chain 200 may be part of a transceiver, with the portions of the receiver chain and accompanying elements being omitted for brevity and ease of explanation. In some illustrative and non-limiting examples, the transmit chain 200 may be included in a base station or other suitable wireless device configured to transmit data in accordance with any suitable wireless communication protocol and/or data rates.

The transmit chain 200 or, alternatively, any portions of the transmit chain 200 as shown in FIG. 2 may be implemented as a system on a chip (SoC). In one illustrative and non-limiting example, the channel processing circuitry 220, transmitter circuitry 204, and/or the DAC 206 may be implemented on the SoC, with chip-to-chip connections or other suitable connections being made to couple these SoC components to the data source 202, the power amplifier (PA) 208, etc. Any of the components of the transmit chain 200, including additional, alternate, or fewer components that those shown in FIG. 2, may be implemented as part of such an SoC depending upon the particular application. Furthermore, any of the components of the transmit chain 200, including additional, alternate, or fewer components that those shown in FIG. 2, may be implemented as separate components, or combined or otherwise integrated as part of the same chip or components. Thus, the components as shown in FIG. 2 are provided for ease of explanation to map respective functions with the blocks shown but is a non-limiting and illustrative example.

The transmit chain 200 as shown in FIG. 2 may include a data interface 203, and may be configured to receive, via the data interface 203, data samples to be transmitted from the data source 202. The data source 202 may be implemented as any suitable type of data source to facilitate the transmission of data in accordance with any suitable data rate and/or communication protocol. The data source 202 may comprise a data modem or any other suitable components configured to provide data samples to be transmitted, which may include in-phase and quadrature-phase (I/Q) data in a digital form. Thus, the data source 202 may provide the input data signal x as discussed herein as part of a digital data stream of I/Q samples and/or blocks of I/Q data samples, as discussed herein. That is, the input data signal x may represent any suitable number of data samples identified with a data transmission.

The data interface 203 may represent any suitable number and/or type of data interface that is configured to transfer data samples between the data source 202, the transmitter circuitry 204, other components of the transmit chain 200, and/or other components of the device in which the transmit chain 200 is implemented. Thus, the data interface 203 may be implemented as any suitable type of data interface for this purpose, such as a serial interface, a JESD-based standard interface, a chip-to-chip (C2C) interface, etc. The data interface 203 may be implemented as any suitable type and/or number of hardware and/or software components, digital logic, data interconnections, wired buses, ports, etc.

The input data signal x and the transmitted data signal y may comply with the requirements of the 3GPP new radio (NR) communication standard. However, it is noted that the techniques disclosed herein are not limited to a specific communication standard, and instead may operate in accordance with any suitable communication standard, specification, and/or protocol. Such protocols may include cellular communications in accordance with the 3GPP standard, which may include both new radio (NR) and LTE communications and may encompass mm-wave frequency bands in the range of 30-300 MHZ. The techniques as discussed herein may be particularly useful for communication protocols that utilize carrier aggregation to transmit a composite signal that includes multiple carrier signals. Such protocols may additionally or alternatively utilize 60 GHZ bands or other suitable frequency bands associated with any of the 802.xx Wi-Fi communication protocols, Wi-Gig, Global Navigation Satellite Systems (GNSS), etc.

The transmit chain 200 includes transmitter circuitry 204, which may be implemented as any suitable number and/or type of components configured to facilitate the generation of the output signal y, which may alternatively be referred to herein as a transmit signal. The transmit signal is thus identified with the signal to be transmitted after the input signal x is subjected to the CFR operations as discussed herein to cancel magnitude peaks in the data samples identified with the input data signal x.

The transmitter circuitry 204 may additionally or alternatively comprise other elements not shown in FIG. 2 for purposes of brevity. That is, the transmitter circuitry 204 may comprise an RF front end and/or any suitable type of components associated with known transmitter operation, configurations, and implementations. The transmitter circuitry 204 may thus include components typically identified with an RF front end such as filters, mixers, local oscillators (LOs), upconverters, downconverters, channel tuners, one or more data interfaces, etc. The data received via the transmitter circuitry 204 (such as received data samples identified with the input signal x), data output by the transmitter circuitry 204 for transmission (such as data samples identified with the output signal y) may be processed as data blocks via the transmitter circuitry 204, as discussed herein.

Therefore, although the input signal x is shown in FIG. 2 and discussed herein as being directly received by the transmitter circuitry and the CFR operations are performed with respect to the input signal x, the transmitter circuitry may additionally perform other operations on the input signal x prior to the CFR operations as discussed herein and/or additional operations after the output signal y is generated. This may include filtering, up-conversion, etc.

The transmitter circuitry 204 comprises processing circuitry 204*a*, which may be configured as any suitable number and/or type of processing circuitry and/or computer processors. The processing circuitry 204*a* may be identified with one or more processors (or suitable portions thereof) implemented by the device or a host system that implements the transmitter circuitry 204. Additionally, or alternatively, the processing circuitry 204*a* may be identified with processing circuitry dedicated to or otherwise identified with the transmit chain 200.

The processing circuitry 204*a* is configured to execute the various CFR operations as further disclosed herein. Software implementations (or portions thereof) may also include the processing circuitry 204*a* being implemented as one or more processors, which execute machine-readable instructions stored in the memory 204*b* to perform the CFR operations as discussed herein. Additionally, or alternatively, the processing circuitry 204*a* may implement hardware implementations via one or more microprocessors, microcontrollers, an application-specific integrated circuit (ASIC), part (or the entirety of) a field-programmable gate array (FPGA), etc. Combinations of the software and hardware implementations may also be utilized. Thus, although the CFR operations are described herein as part of the functionality of a CFR "algorithm," the CFR operations may be performed as software-based, hardware-based, or combinations of software and hardware-based implementations.

The transmitter circuitry 204 comprises memory 204*b*, which may be configured to store data and/or instructions such that, when the instructions are executed by the processing circuitry 204*a*, cause the processing circuitry 204*a* to perform various CFR operations as described herein. The memory 204*b* may be implemented as any well-known volatile and/or non-volatile memory, including read-only memory (ROM), random access memory (RAM), flash memory, a magnetic storage media, an optical disc, erasable programmable read only memory (EPROM), programmable read only memory (PROM), etc. The memory 204*b* may be non-removable, removable, or a combination of both. The memory 204*b* may be implemented as a non-transitory computer readable medium storing one or more executable instructions such as, for example, logic, algorithms, code, etc. In any event, the instructions, logic, code, etc., stored in the memory 204*b* may enable the functionality disclosed herein identified with the execution of the CFR operations to be functionally realized.

Once the transmitter circuitry generates the output data signal y, which may be represented as a block of data samples, these data samples are then provided to the DAC 206 as shown in FIG. 2. These data samples are then converted to their analog-value equivalents, provided to the power amplifier 208, and then transmitted via the antenna 210. Because the data samples representing the output data signal y are CFR-corrected, i.e., the peaks exceeding the predetermined threshold are removed (or at least significantly reduced), efficiency of the PA 208 is ensured as the output signal y meets the PAPR goal as discussed above.

Examples of enhanced peak cancellation CFR technique are explained hereafter. In order to address the issues of the conventional peak cancellation CFR technique discussed above with respect to FIG. 1, in the example techniques disclosed herein, the peak cancellation CFR is performed with two thresholds: a first threshold and a second threshold. The first threshold is used for detection of the peaks and the second threshold may be used for hard clipping that may be performed after the peak cancellation using the first threshold. The second threshold is set based on the target PAPR. The first threshold that is used in detecting the peaks in the input signal samples is set slightly higher than the second threshold. All the peaks in a block of input signal samples are detected using the first threshold. In some examples, the peaks may be grouped into clusters and the biggest peak in each cluster (i.e., the cluster peak) may be identified. A gain factor for each peak (or each cluster peak) is then determined and each peak (or cluster peak) is cancelled using a scaled cancellation pulse. In examples, the peak cancellation may be performed in one iteration. Hard clipping may then be additionally performed using the second threshold to remove all the leftover small peaks to achieve the required PAPR, if necessary.

In accordance with the example CFR techniques disclosed herein, the EVM and complexity of the algorithm are reduced. In examples, the EVM is reduced by performing the CFR using a threshold that is set slightly higher than the target threshold, and the CFR complexity is reduced because all the CFR operations such as peak detection, gain computation, and peak cancellation are all performed in one iteration.

Figure 3A:
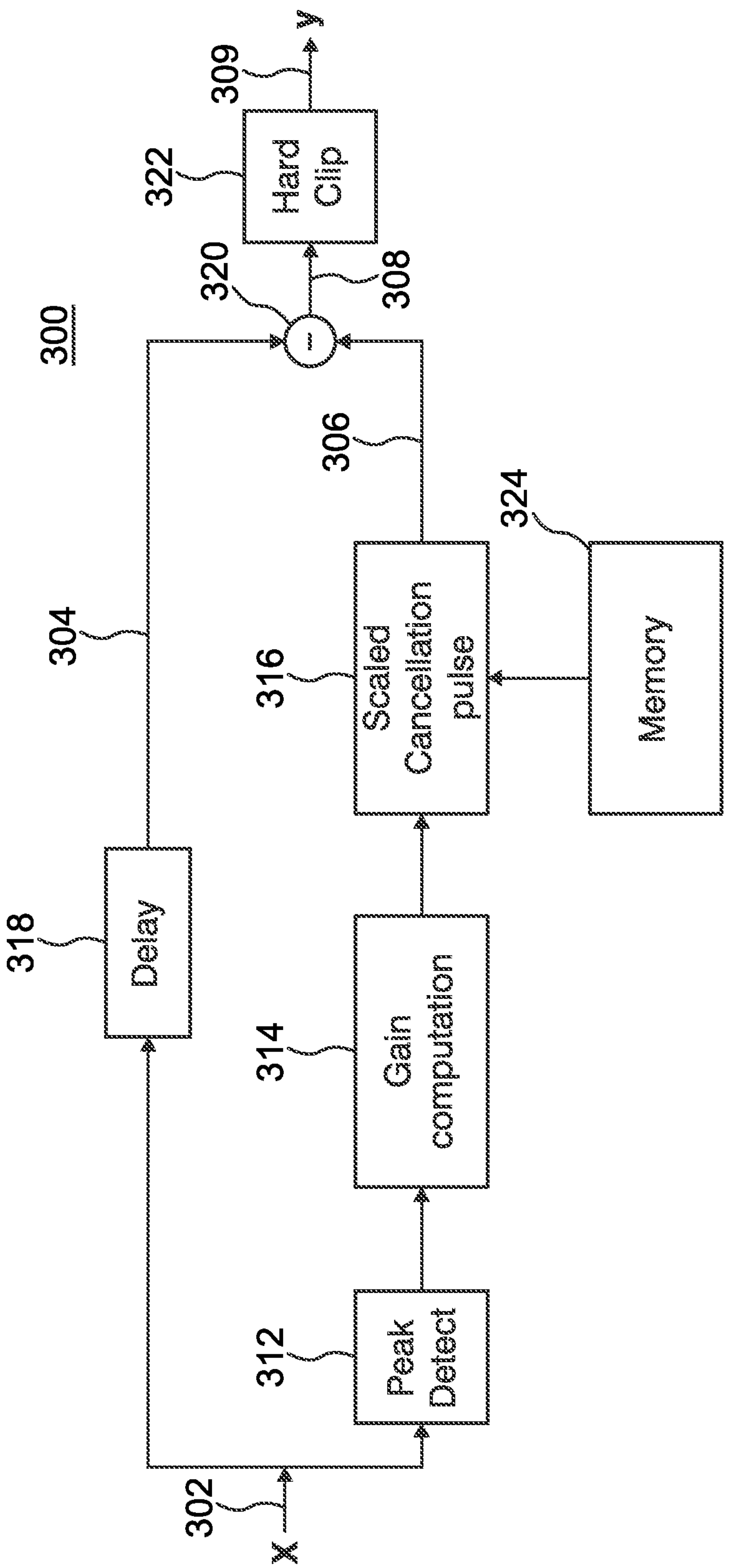
FIG. 3A shows a block diagram of an apparatus for CFR in accordance with one example.

FIG. 3A shows a block diagram of an apparatus for CFR in accordance with one example. The apparatus 300 includes a peak detection circuit 312, a gain computation circuit 314, a scaled cancellation pulse generation circuit 316, a delay circuit 318, a combiner circuit 320, and a hard clipping circuit 322. The apparatus 300 may include a memory 324. The apparatus 300 as shown in FIG. 3A includes several circuits, blocks, or modules that may be considered a part of the transmitter circuitry 204 and thus represent any suitable number and/or type of hardware components, software components, or combinations of these to facilitate the respective functions as discussed herein.

The apparatus 300 receives the input signal x 302, which may be the input signal x as discussed above with respect to FIG. 2. The input signal 302 may represent a block of digital data samples of any suitable number, which represent the input signal to be transmitted via any suitable transmit chain, such as the transmit chain 200 as discussed herein. Each data sample may represent a complex value based upon the in-phase/quadrature (I/Q) data provided by the data source.

The input signal 302 is delayed via the delay circuit 318 while the input signal 302 is processed for peak detection and cancellation pulse generation. The delay circuit 312 may be one or more buffers or other suitable memory components configured to temporarily store the data samples for the input signal 302 until the final scaled cancellation pulse signal 306 is generated, as discussed in further detail below. Thus, the delay circuit 318 may be configured to delay the input signal 302 to compensate for the CFR processing operations such that the scaled data samples identified with the cancellation pulse signal 306 are subtracted from the data samples in the input signal 302 in a time-aligned manner, thereby generating the output signal 308.

The input signal x 302 may be a signal that has been sampled in accordance with an associated sampling rate. This sampling rate needs to be a minimum sampling value that is greater than the bandwidth of the input signal, and which may be performed using known data processing techniques. Thus, the input signal x 302 may represent a signal that has been sampled in accordance with any suitable sampling rate from a previous sampling process that occurs in an earlier stage of the transmit chain. The input signal x 302 may be further up-sampled as part of the peak detection and gain computation CFR operations by the peak detection circuit 312 and the cancellation pulse generation circuit 316. The further up-sampling of the input signal 302 is optional.

The peak detection circuit 312 detects a sample in the input signal 302 that has a corresponding magnitude exceeding the first threshold. For detecting the peaks, the peak detection circuit 312 determines the magnitude (or the squared magnitude) of each pulse in the input signal samples and compare it to the first threshold. The peak detection circuit 312 may detect all the peaks in a block of input signal samples using the first threshold (e.g., detect all peaks above the first threshold). In some examples, the detected peaks may be grouped into a plurality of clusters, and the biggest peak in each cluster (i.e., the cluster peak) may be identified. In each segment, only the peak with the maximum magnitude among all peaks in each segment is identified. In this example, each cluster peak may be subject to cancellation using a scaled cancellation pulse.

The first threshold is set slightly higher than the second threshold. The second threshold is determined based on the target PAPR. Therefore, in examples, the peaks are detected with a detection threshold (the first threshold) that is set higher than the target threshold (the second threshold), which is set based on the target PAPR. For example, the first threshold may be set 2-3% higher than the second threshold. The 2-3% range is merely an example, not a limitation, and other range value may be used.

The second threshold may be determined or otherwise known a priori from the operating parameters of the power amplifier (PA) that is transmitting the output signal 309. For example, the second threshold may be determined based on an upper transmission power limit of the PA or selected based upon this upper limit such as 90%, 95%, etc. of the maximum power limit. The second threshold may be determined based on the operating parameters of the PA in accordance with a particular signal configuration of the input signal 302, such that specific PAPR conditions are met for a particular data transmission. The second threshold may be predetermined or may be computed in accordance with each different signal transmission for which the CFR operations are performed. That is, the second threshold may be determined based on a desired transmission power level, the configuration of the input signal, the operating parameters of the PA, etc.

If at least one peak to be cancelled is detected in the input signal, further processing for cancellation of the detected peak(s) is performed with the gain computation circuit 314 and the scaled cancellation pulse generation circuit 316 to reduce the identified peak(s) from the input signal 302. The peak detection circuit 312 provides information for the detected peaks (e.g., the delay time or location of the detected peaks in the input signal samples, the (complex) value of the detected peaks, etc.) to the gain computation circuit 314. The gain computation circuit 314 then determines a gain factor that scales the value of each peak sample. The gain factor is used in the scaled cancellation pulse generation circuit 316 in generating the scaled cancellation pulse. The magnitude of the detected peaks may be used to determine the gain factors for the detected peaks.

The gain computation circuit 314 computes a scaling factor for each peak sample in the input signal 302 based on the first threshold. The scaling factor is the number indicative of a magnitude by which each peak sample exceeds the first threshold. The scaling factor may be expressed as a complex value. The gain computation circuit 314 uses the scaling factor identified with each detected peak sample, e.g., the samples identified via the peak detection circuit 312, to determine a gain factor for the detected peak. The gain computation circuit 314 may determine gain factors for the detected peaks such that the resulting final scaled cancellation pulse signal cancels all the identified cluster peaks in the input signal samples in a single iteration. The gain computation is executed in an efficient manner because the gain computations are limited to the samples identified via the peak detection circuit 312, and these peak samples need not be re-detected.

The gain computation circuit 314 may compute a corresponding scaling factor for each of a number of detected peak samples. The gain computation circuit utilizes the scaling factors corresponding to the peak samples to compute a set of gain factors, with one gain factor per peak sample. The gain factors are generated based upon the scaling factors. As the scaling factors identify a magnitude by which sample exceeds the first threshold value, the gain factor for that same sample is the value that, when multiplied by the corresponding sample in the cancellation pulse and then subtracted from the input signal x, results in a reduction of that sample's respective magnitude to less than or equal to the first threshold value.

The scaled cancellation pulse generation circuit 316 receives the timing offset at which the detected peaks (e.g., cluster peaks) are located, the gain factors for the cancellation pulses, etc., and generates a scaled cancellation pulse 306 for each detected peak. The scaled cancellation pulse generation circuit 306 generates a cancellation pulse at the location of each (cluster) peak detected by the peak detection circuit 312.

The scaled cancellation pulse generation circuit 316 generates a set of scaled cancellation pulse signals (i.e., an aggregation of a set of scaled cancellation pulse signals for the detected peaks) that is subtracted from the delayed input signal samples 304 provided via the delay circuit 318. This results in a cancellation of all or a significant number of the signal samples in the input signal 302 that previously had a corresponding magnitude exceeding the first threshold.

In some examples, each of the set of scaled cancellation pulse signals may be generated by selecting a cancellation pulse from a memory 324 and multiplying a respective gain factor to the cancellation pulse selected from the memory 324. Thus, each of the set of scaled cancellation pulse signals represents a multiplication of a respective stored cancellation pulse signal with a respective gain factor. The gain factor for each peak sample is used to scale the cancellation pulse signal obtained from the memory 324 to generate a scaled cancellation pulse for the corresponding peak, which is then subtracted from the input signal. This scaling operation includes multiplying the scaling value for each peak sample by the matching sample number in the cancellation pulse signal.

The cancellation pulses pre-generated and stored in the memory 324 may be configured based on the signal configuration of the input signal. That is, the cancellation pulses stored in the memory may include a number of data samples with a specific sampling rate, shape, etc. The cancellation pulse may be selected from the memory 324 based upon parameters of the input signal 302. The cancellation pulses may be generated in any suitable manner or retrieved from a suitable memory location and may be configured in accordance with any suitable techniques. The cancellation pulses may be generated based upon the transmission scheme of the input signal, which may include a number of carriers, a bandwidth, a spectral location of each carrier, etc. That is, the cancellation pulses may be generated based upon a Fourier transform relationship with the spectral configuration of the input data signal.

Figure 3B:
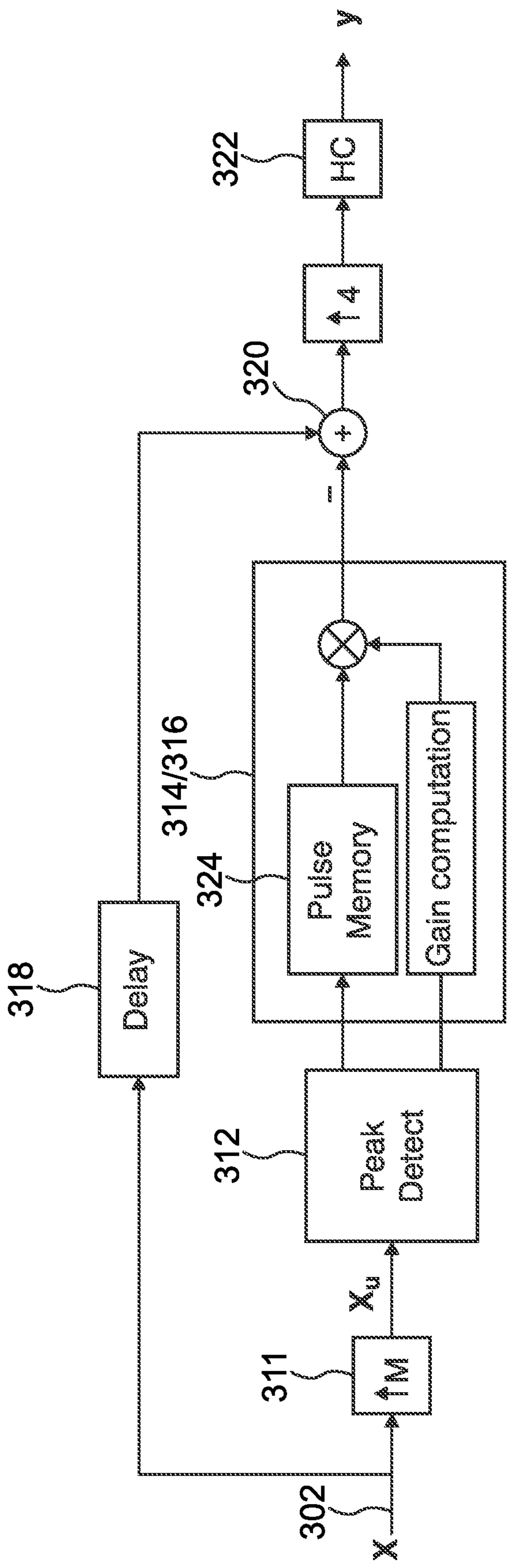
FIG. 3B shows a block diagram of an apparatus for CFR where the input signal is up-sampled by an interpolator.

As explained above, the input signal 302 may be further up-sampled and the peaks may be detected on the up-sampled input signal samples. FIG. 3B shows the scheme where the input signal 302 is up-sampled by an interpolator 311. The interpolator 311 (up-sampling circuit) up-samples the input signal 302 by an interpolation factor of M. The peak detector 312 then detects the peaks in the up-sampled input samples and sends the pulse phase (e.g., 1, 2, . . . , M) of the detected peaks to the gain computation/scaled cancellation pulse generation circuit 314/316. The cancellation pulse is generated at the up-sampled/interpolated rate by a factor of M. Based on the pulse phase (e.g., 1, 2, . . . , M) of the detected peak position of the up-sampled input signal, the corresponding phase of the cancellation pulse (1, 2, . . . , M) is chosen for the detected peak. Peak cancellation by the combiner 320 is performed at the original sampling rate of the input signal x 302. Detecting peaks at a higher sample rate may enable to reduce peak regrowth, and cancellation at a lower sampling rate may reduce the CFR complexity.

To reduce the complexity and processing power required to execute the CFR algorithm, a peak clustering operation may be performed. The peak detection circuit 312 may be configured with a predetermined delta value and use this delta value to cluster/group peak samples such that the difference between sample locations within each cluster is less than twice the predetermined delta value. For example, each cluster may span a number of samples that is equal to twice the predetermined delta value. The cluster length may be determined based on the middle part of the cancellation pulse and is equal to twice the predetermined delta value. This delta value may vary with different input signals. The predetermined delta value may be selected based upon the sample length of the cancellation pulse. In one non-limiting and illustrative scenario, the predetermined delta value may be selected to ensure that the parallel cancellation of each cluster peak via the use of the scaled cancellation pulse does not interfere with other adjacent clusters. The predetermined delta value may be selected such that clusters do not overlap with one another, with each cluster spanning a number of samples equal to the twice the delta value.

Figure 4A:
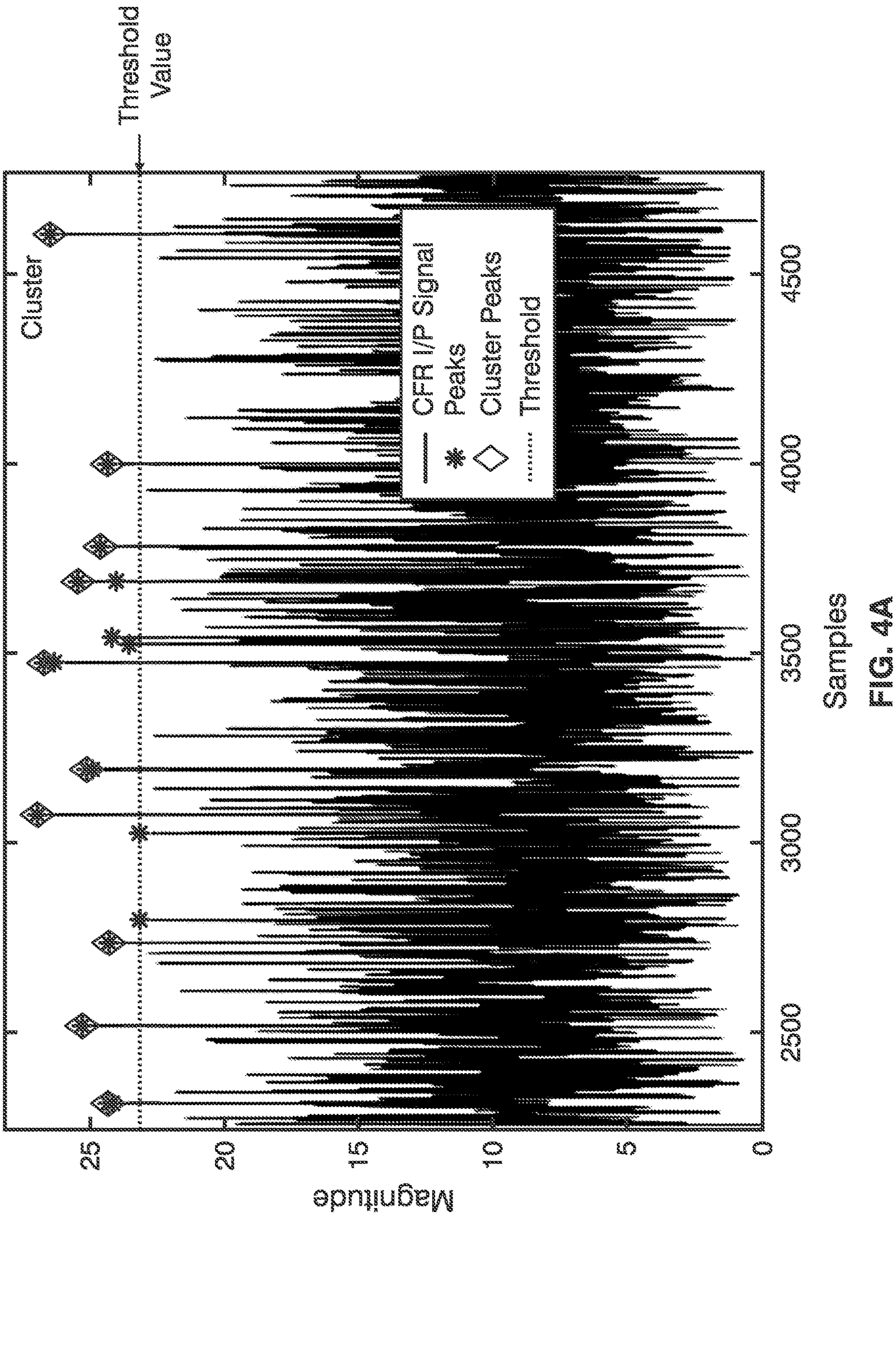
FIG. 4A shows detected peak samples, clusters, and identified cluster peaks in accordance with one example.

FIG. 4A shows detected peak samples, clusters, and identified cluster peaks in accordance with one example. In this example, the predetermined delta value is selected as 30 samples, and the cluster length is 60 samples. In this example shown in FIG. 4A, each cluster spans 60 samples. In FIG. 4A, a number of peak samples (Np) is detected, which are designated via the '*' shaped markers, which correspond to the peak detection process as discussed above. The total number of peak samples Np are then grouped into a number of peak clusters Nc based upon the delta value, with Np=18, and Nc=10 clusters being shown in FIG. 4A, with Np≥Nc. The peak detection and/or gain computation circuits 312/314 may then identify the peak sample in each cluster having the highest magnitude, which is referred to as a "cluster peak sample." Thus, there are a total number of Nc cluster peak samples identified as part of this process, with the number of cluster peaks Nc being a subset of the total number of peak samples Np.

The gain computation circuit 314 may determine a corresponding scaling factor for each of the Nc number of cluster peak samples. Therefore, the gain computation circuit 314 utilizes this smaller subset of scaling factors corresponding to the cluster peak samples to compute a set of gain factors, with one gain factor per cluster peak sample. The gain factors are then generated based upon the scaling factors. That is, as the scaling factors identify a magnitude by which peak sample exceeds the predetermined threshold value, the gain factor for that same sample is the value that, when multiplied by the corresponding sample in the cancellation pulse and then subtracted from the input signal x, results in a reduction of that peak sample's respective magnitude to less than or equal to the predetermined threshold value (the first threshold). The gain factors may be represented as a vector of size 1×Np.

Figure 4B:
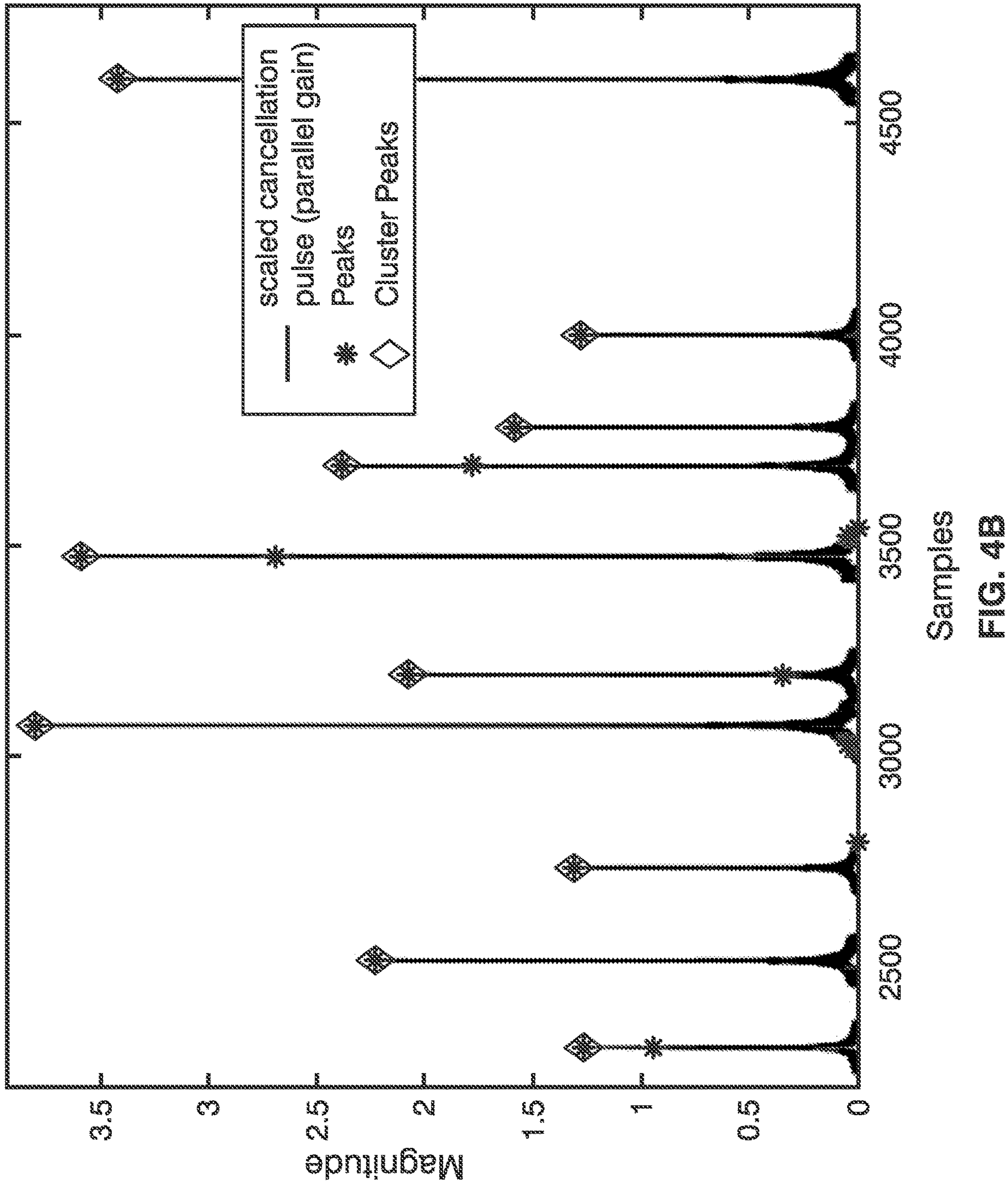
FIG. 4B shows a set of scaled cancellation pulses generated for the cluster peaks identified in FIG. 4A.
Figure 4C:
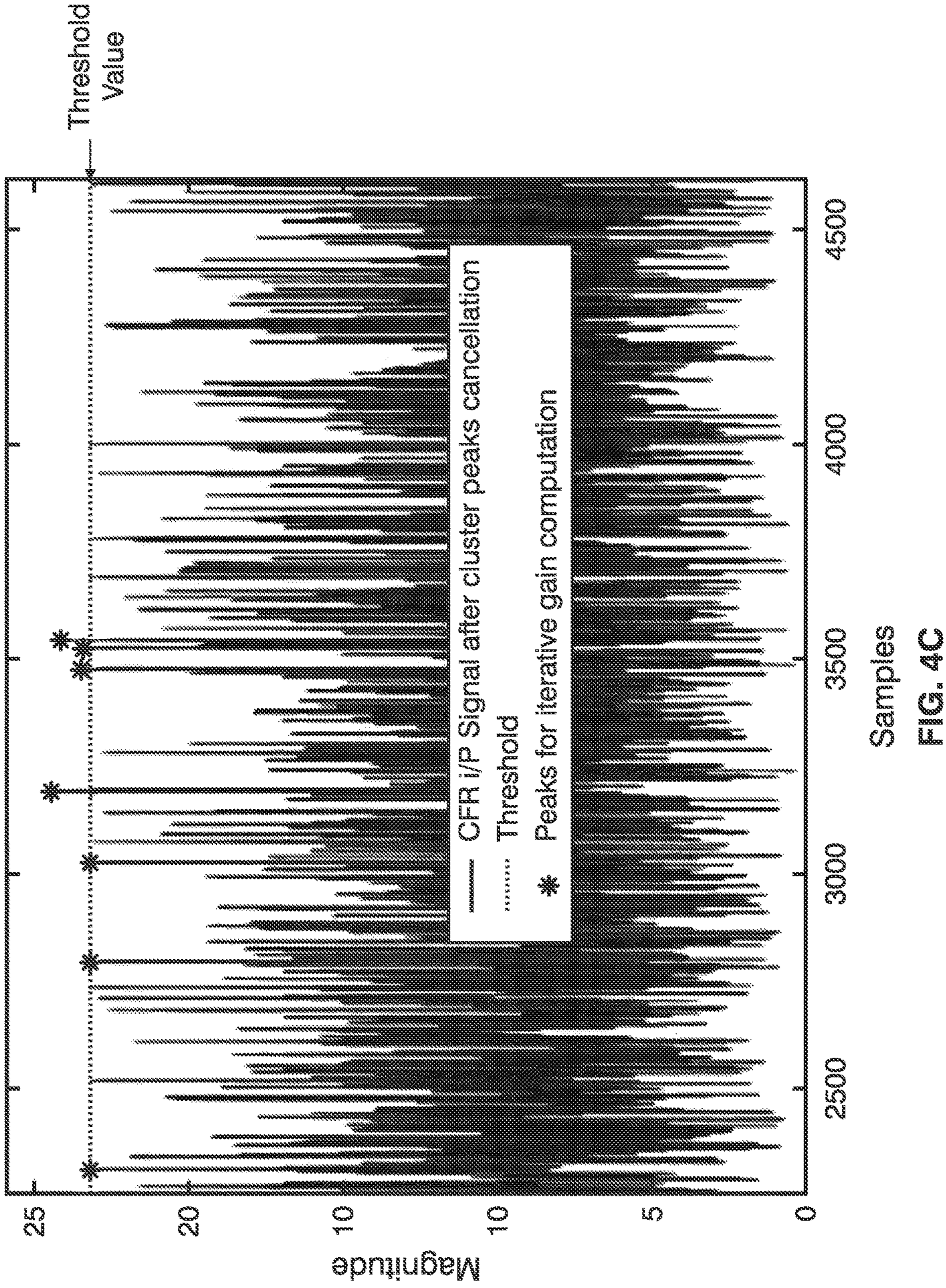
FIG. 4C shows a resulting input signal after the application of the scaled cancellation pulses in accordance with one example

Once the gain factors are computed for each cluster peak sample, the gain factor for each cluster peak sample is used to scale a cancellation pulse (that may be obtained from a memory) to generate a scaled cancellation pulse, which is then subtracted from the input signal. FIG. 4B shows a set of scaled cancellation pulses generated for the cluster peaks identified in FIG. 4A, and FIG. 4C shows a resulting input signal after the application of the scaled cancellation pulses in accordance with one example. This subtraction operation results in a reduction of each cluster peak sample's respective magnitude to less than or equal to the predetermined threshold value.

The scaled cancellation pulse (in-phase and quadrature pulse values) produced by the scaled cancellation pulse generation circuit 316 are forwarded to the combiner circuit 320 for summing with the input signal samples 302. The input signal samples 302 are delayed by the delay circuit 318 so that the cancellation pulse 306 is applied to the correct location in the time-domain and thus reduce the peak amplitude at the correct point. The scaled cancellation pulse signal is subtracted from the delayed input signal 304 to eliminate or at least significantly reduce the peak samples in a single iteration to generate the output signal 308. The resulting output signal 308 may constitute a block of data samples having a maximum magnitude that is equal to or less than the first threshold.

The output signal 308 from the combiner circuit 320 may be further processed by the hard clipping circuit 322 with the second threshold to remove/reduce any unprocessed peaks or regrown peaks from the input signal samples 302. The hard clipping circuit 322 compresses any peaks that remain after the peak cancellation to the second threshold level.

The output 309 from the hard clipping circuit 322 may then be sent to a digital-to-analog convertor (DAC) for conversion to an analog signal for transmission after amplification by a power amplifier, or the like.

Figure 5:
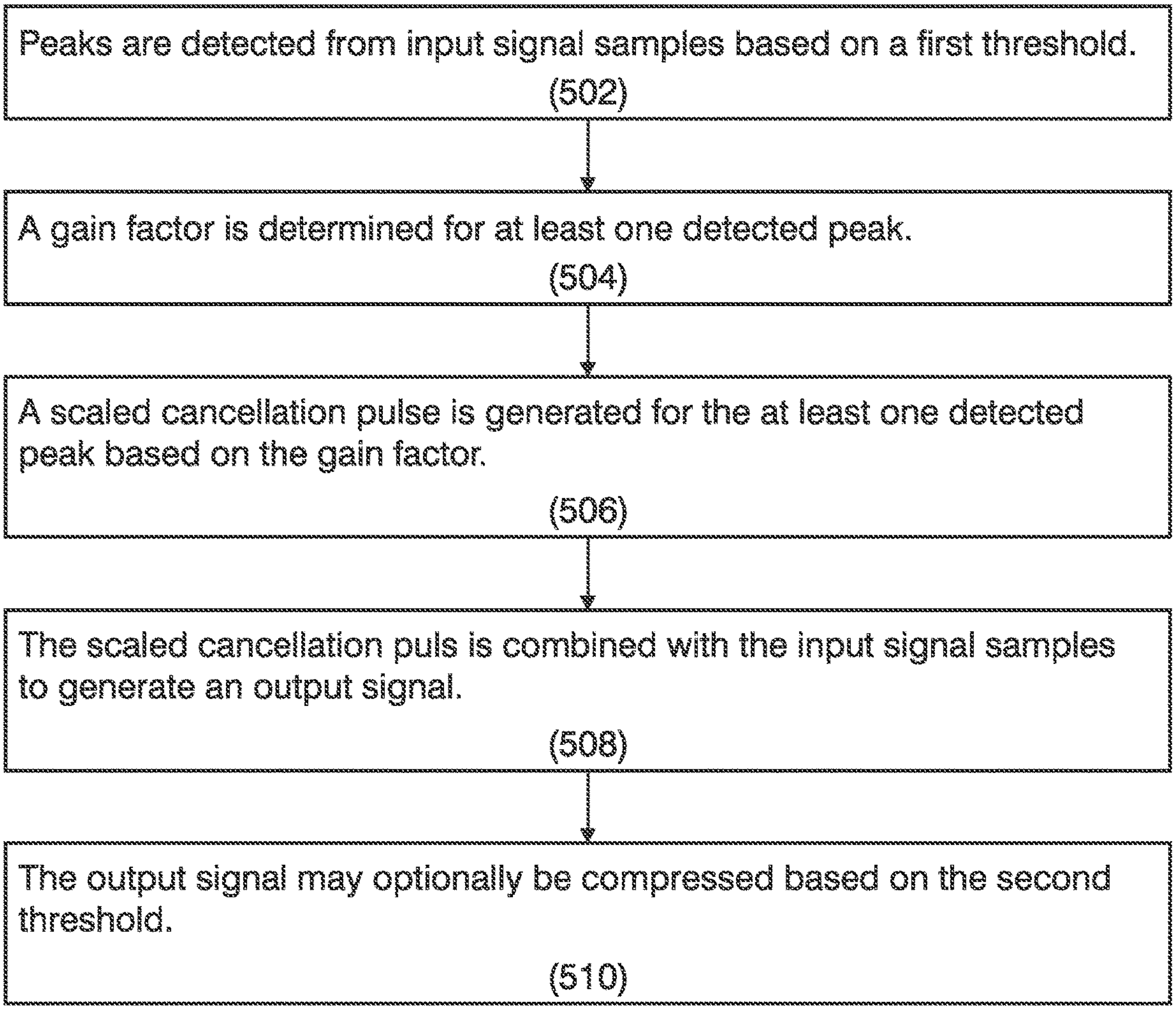
FIG. 5 is a flow diagram of an example process for CFR.

FIG. 5 is a flow diagram of an example process for CFR. Peaks are detected from input signal samples based on a first threshold (502). The first threshold is set higher than a second threshold that is determined based on a target PAPR. A gain factor is determined for at least one detected peak (504). A scaled cancellation pulse is generated for the at least one detected peak based on the gain factor (506). The scaled cancellation pulse is combined with the input signal samples to generate an output signal (508). In some examples, the output signal may optionally be compressed (hard clipping) based on the second threshold (510). In some examples, the detected peaks may be grouped into a plurality of clusters and a cluster peak may be selected from each cluster, the gain factor may be determined for each cluster peak, and the scaled cancellation pulse may be generated for each cluster peak.

In some examples, a pre-stored cancellation pulse may be obtained from a memory based on parameters of the input signal samples, and the scaled cancellation pulse may be generated by multiplying the gain factor for the at least one detected peak with the pre-stored cancellation pulse obtained from the memory. The pre-stored cancellation pulse may be generated based on a transmission scheme of the input signal samples.

In examples, the scaled cancellation pulse may be generated and combined with the input signal samples in one iteration. In some examples, the first threshold may be 2-3% higher than the second threshold. In some examples, the input signal samples may be further up-sampled, and the peaks may be detected from the up-sampled input signal samples based on the first threshold.

Figure 6:
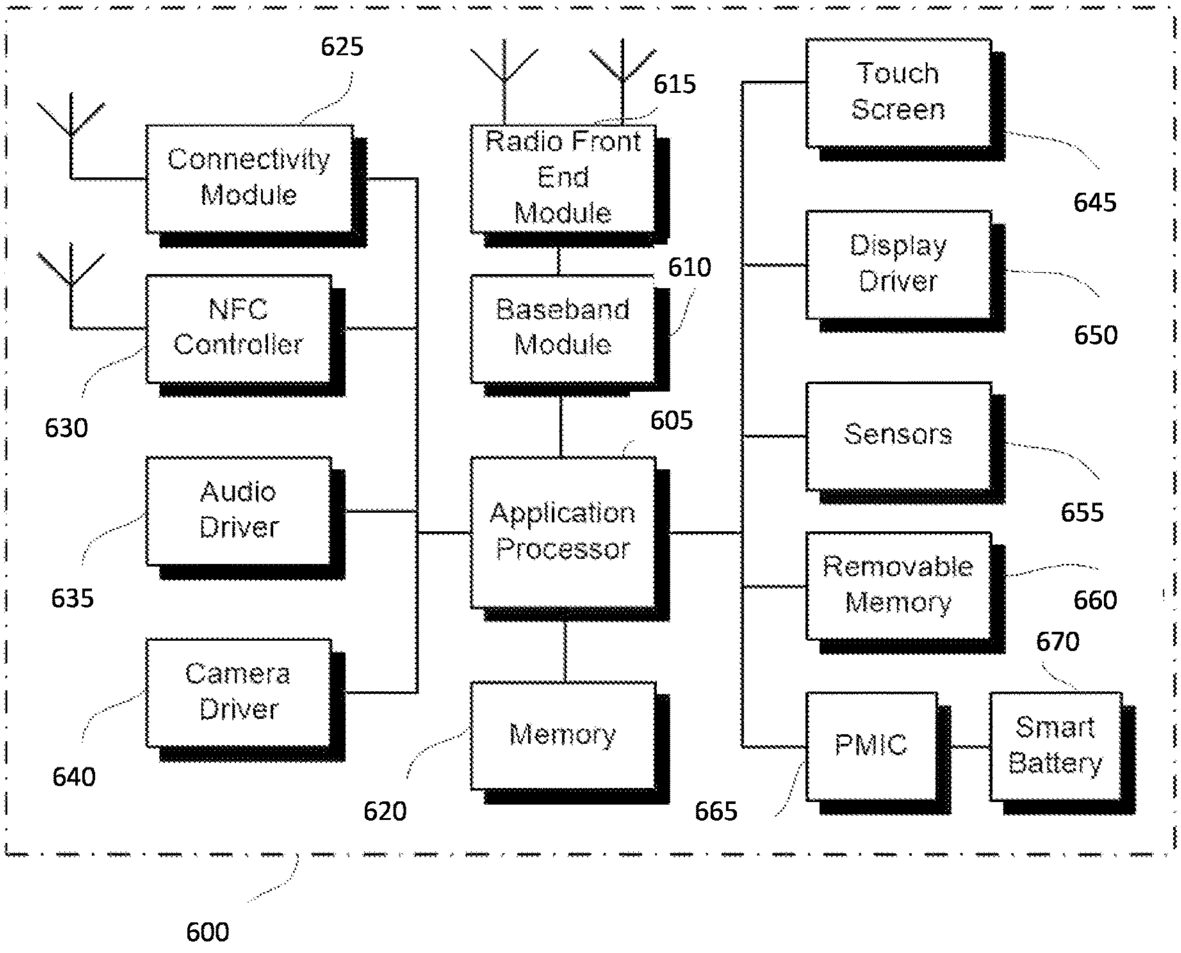
FIG. 6 illustrates a user device in which the examples disclosed herein may be implemented.

FIG. 6 illustrates a user device 600 in which the examples disclosed herein may be implemented. For example, the examples disclosed herein may be implemented in the radio front-end module 615, in the baseband module 610, etc. The user device 600 may be a mobile device in some aspects and includes an application processor 605, baseband processor 610 (also referred to as a baseband module), radio front end module (RFEM) 615, memory 620, connectivity module 625, near field communication (NFC) controller 630, audio driver 635, camera driver 640, touch screen 645, display driver 650, sensors 655, removable memory 660, power management integrated circuit (PMIC) 665 and smart battery 670.

In some aspects, application processor 605 may include, for example, one or more CPU cores and one or more of cache memory, low drop-out voltage regulators (LDOs), interrupt controllers, serial interfaces such as serial peripheral interface (SPI), inter-integrated circuit (I2C) or universal programmable serial interface module, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 610 may be implemented, for example, as a solder-down substrate including one or more integrated circuits, a single packaged integrated circuit soldered to a main circuit board, and/or a multi-chip module containing two or more integrated circuits.

Figure 7:
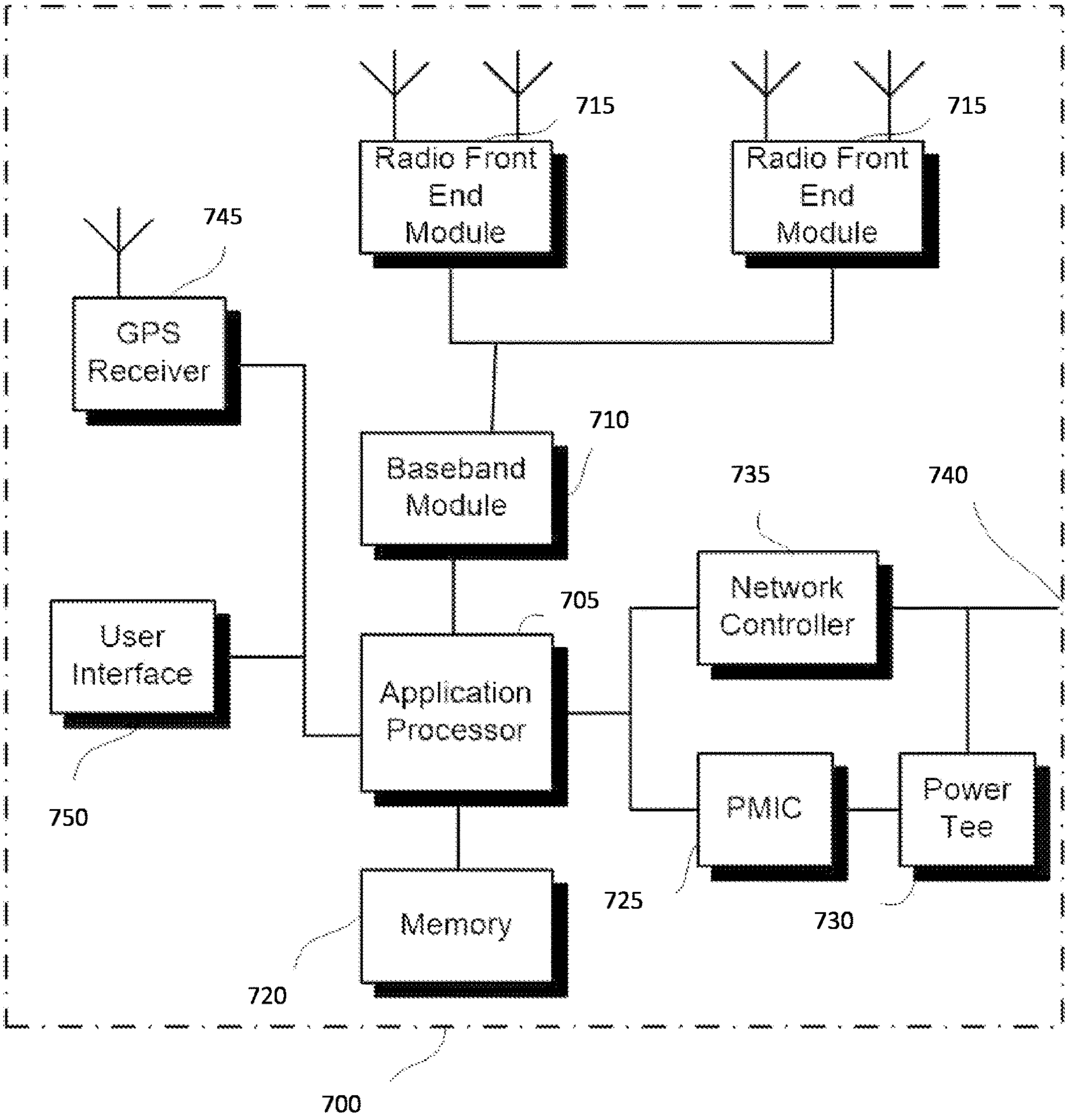
FIG. 7 illustrates a base station or infrastructure equipment radio head in which the examples disclosed herein may be implemented.

FIG. 7 illustrates a base station or infrastructure equipment radio head 700 in which the examples disclosed herein may be implemented. For example, the examples disclosed herein may be implemented in the radio front-end module 715, in the baseband module 710, etc. The base station radio head 700 may include one or more of application processor 705, baseband modules 710, one or more radio front end modules 715, memory 720, power management circuitry 725, power tee circuitry 730, network controller 735, network interface connector 740, satellite navigation receiver module 745, and user interface 750.

In some aspects, application processor 705 may include one or more CPU cores and one or more of cache memory, low drop-out voltage regulators (LDOs), interrupt controllers, serial interfaces such as SPI, I2C or universal programmable serial interface module, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 710 may be implemented, for example, as a solder-down substrate including one or more integrated circuits, a single packaged integrated circuit soldered to a main circuit board or a multi-chip module containing two or more integrated circuits.

In some aspects, memory 720 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto resistive random access memory (MRAM) and/or a three-dimensional crosspoint memory. Memory 720 may be implemented as one or more of solder down packaged integrated circuits, socketed memory modules and plug-in memory cards.

In some aspects, power management integrated circuitry 725 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 730 may provide for electrical power drawn from a network cable to provide both power supply and data connectivity to the base station radio head 700 using a single cable.

In some aspects, network controller 735 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 745 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 745 may provide data to application processor 705 which may include one or more of position data or time data. Application processor 705 may use time data to synchronize operations with other radio base stations.

In some aspects, user interface 750 may include one or more of physical or virtual buttons, such as a reset button, one or more indicators such as light emitting diodes (LEDs) and a display screen.

Another example is a computer program having a program code for performing at least one of the methods described herein, when the computer program is executed on a computer, a processor, or a programmable hardware component. Another example is a machine-readable storage including machine readable instructions, when executed, to implement a method or realize an apparatus as described herein. A further example is a machine-readable medium including code, when executed, to cause a machine to perform any of the methods described herein.

The examples as described herein may be summarized as follows:

An example (e.g., example 1) relates to an apparatus for performing CFR. The apparatus includes a peak detection circuit configured to detect peaks from input signal samples based on a first threshold, wherein the first threshold is higher than a second threshold that is determined based on a target PAPR, a gain computation circuit configured to determine a gain factor for at least one detected peak, a scaled cancellation pulse generation circuit configured to generate a scaled cancellation pulse for the at least one detected peak based on the gain factor, and a combiner circuit configured to combine the scaled cancellation pulse with the input signal samples to generate an output signal.

Another example, (e.g., example 2) relates to a previously described example (e.g., example 1), further comprising a hard clipping circuit configured to compress the output signal based on the second threshold.

Another example, (e.g., example 3) relates to a previously described example (e.g., any one of examples 1-2), wherein the peak detection circuit is configured to group detected peaks into a plurality of clusters and select a cluster peak from each cluster, the gain computation circuit is configured to determine the gain factor for each cluster peak, and the scaled cancellation pulse generation circuit is configured to generate the scaled cancellation pulse for each cluster peak.

Another example, (e.g., example 4) relates to a previously described example (e.g., any one of examples 1-3), further comprising a memory for storing cancellation pulses, wherein the scaled cancellation pulse generation circuit is configured to obtain a cancellation pulse from the memory based on parameters of the input signal samples and generate the scaled cancellation pulse by multiplying the gain factor for the at least one detected peak with the cancellation pulse obtained from the memory.

Another example, (e.g., example 5) relates to a previously described example (e.g., example 4), wherein the pre-stored cancellation pulse is generated based on a transmission scheme of the input signal samples.

Another example, (e.g., example 6) relates to a previously described example (e.g., any one of examples 1-5), wherein the scaled cancellation pulse is generated and combined with the input signal samples in one iteration.

Another example, (e.g., example 7) relates to a previously described example (e.g., any one of examples 1-6), wherein the first threshold is 2-3% higher than the second threshold.

Another example, (e.g., example 8) relates to a previously described example (e.g., any one of examples 1-7), further comprising an up-sampling circuit configured to up-sample the input signal samples, and the peak detection circuit is configured to detect the peaks from the up-sampled input signal samples based on the first threshold.

Another example, (e.g., example 9) relates to a previously described example (e.g., any one of examples 1-8), further comprising a digital-to-analog converter configured to convert the output signal to an analog signal, and a power amplifier configured to amplify the analog signal.

Another example, (e.g., example 10) relates to a method for CFR. The method includes detecting peaks from input signal samples based on a first threshold, wherein the first threshold is higher than a second threshold that is determined based on a target PAPR, determining a gain factor for at least one detected peak, generating a scaled cancellation pulse for the at least one detected peak based on the gain factor, and combining the scaled cancellation pulse with the input signal samples to generate an output signal.

Another example, (e.g., example 11) relates to a previously described example (e.g., example 10), further comprising compressing the output signal based on the second threshold.

Another example, (e.g., example 12) relates to a previously described example (e.g., any one of examples 10-11), wherein the detected peaks are grouped into a plurality of clusters and a cluster peak is selected from each cluster, the gain factor is determined for each cluster peak, and the scaled cancellation pulse is generated for each cluster peak.

Another example, (e.g., example 13) relates to a previously described example (e.g., any one of examples 10-12), further comprising obtaining a pre-stored cancellation pulse from a memory based on parameters of the input signal samples, wherein the scaled cancellation pulse is generated by multiplying the gain factor for the at least one detected peak with the pre-stored cancellation pulse obtained from the memory.

Another example, (e.g., example 14) relates to a previously described example (e.g., example 13), wherein the pre-stored cancellation pulse is generated based on a transmission scheme of the input signal samples.

Another example, (e.g., example 15) relates to a previously described example (e.g., any one of examples 10-14), wherein the scaled cancellation pulse is generated and combined with the input signal samples in one iteration.

Another example, (e.g., example 16) relates to a previously described example (e.g., any one of examples 10-15), wherein the first threshold is 2-3% higher than the second threshold.

Another example, (e.g., example 17) relates to a previously described example (e.g., any one of examples 10-16), further comprising up-sampling the input signal samples, wherein the peaks are detected from the up-sampled input signal samples based on the first threshold.

Another example, (e.g., example 18) relates to a non-transitory computer-readable medium having instructions stored thereon that, when executed by processing circuitry, cause the processing circuitry to perform the method as in any one of examples 10-17.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F) PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

The invention claimed is:

1. An apparatus for performing crest factor reduction (CFR), comprising:
- a peak detection circuit configured to detect peaks from input signal samples based on a first threshold, wherein the first threshold is higher than a second threshold that is determined based on a target peak-to-average power ratio (PAPR);
- a gain computation circuit configured to determine a gain factor for at least one detected peak;
- a scaled cancellation pulse generation circuit configured to generate a scaled cancellation pulse for the at least one detected peak based on the gain factor; and
- a combiner circuit configured to combine the scaled cancellation pulse with the input signal samples to generate an output signal.

2. The apparatus of claim 1, further comprising:
- a hard clipping circuit configured to compress the output signal based on the second threshold.

3. The apparatus of claim 1, wherein the peak detection circuit is configured to group detected peaks into a plurality of clusters and select a cluster peak from each cluster, the gain computation circuit is configured to determine the gain factor for each cluster peak, and the scaled cancellation pulse generation circuit is configured to generate the scaled cancellation pulse for each cluster peak.

4. The apparatus of claim 1, further comprising:
- a memory for storing cancellation pulses,
- wherein the scaled cancellation pulse generation circuit is configured to obtain a cancellation pulse from the memory based on parameters of the input signal samples and generate the scaled cancellation pulse by multiplying the gain factor for the at least one detected peak with the cancellation pulse obtained from the memory.

5. The apparatus of claim 4, wherein the cancellation pulses stored in the memory are generated based on a transmission scheme of the input signal samples.

6. The apparatus of claim 1, wherein the scaled cancellation pulse is generated and combined with the input signal samples in one iteration.

7. The apparatus of claim 1, wherein the first threshold is 2-3% higher than the second threshold.

8. The apparatus of claim 1, further comprising an up-sampling circuit configured to up-sample the input signal samples, and the peak detection circuit is configured to detect the peaks from the up-sampled input signal samples based on the first threshold.

9. The apparatus of claim 1, further comprising:
a digital-to-analog converter configured to convert the output signal to an analog signal; and
a power amplifier configured to amplify the analog signal.

10. A method for crest factor reduction (CFR), comprising:
detecting peaks from input signal samples based on a first threshold, wherein the first threshold is higher than a second threshold that is determined based on a target peak-to-average power ratio (PAPR);
determining a gain factor for at least one detected peak;
generating a scaled cancellation pulse for the at least one detected peak based on the gain factor; and
combining the scaled cancellation pulse with the input signal samples to generate an output signal.

11. The method of claim 10, further comprising:
compressing the output signal based on the second threshold.

12. The method of claim 10, wherein the detected peaks are grouped into a plurality of clusters and a cluster peak is selected from each cluster, the gain factor is determined for each cluster peak, and the scaled cancellation pulse is generated for each cluster peak.

13. The method of claim 10, further comprising obtaining a pre-stored cancellation pulse from a memory based on parameters of the input signal samples, wherein the scaled cancellation pulse is generated by multiplying the gain factor for the at least one detected peak with the pre-stored cancellation pulse obtained from the memory.

14. The method of claim 13, wherein the pre-stored cancellation pulse is generated based on a transmission scheme of the input signal samples.

15. The method of claim 10, wherein the scaled cancellation pulse is generated and combined with the input signal samples in one iteration.

16. The method of claim 10, wherein the first threshold is 2-3% higher than the second threshold.

17. The method of claim 10, further comprising up-sampling the input signal samples, wherein the peaks are detected from the up-sampled input signal samples based on the first threshold.

18. A non-transitory computer-readable medium having instructions stored thereon that, when executed by processing circuitry, cause the processing circuitry to perform the method of claim 10.

* * * * *